(12) United States Patent
Willi et al.

(10) Patent No.: US 7,882,945 B2
(45) Date of Patent: Feb. 8, 2011

(54) ROLLING CONVEYOR WITH A DRIVE ASSEMBLY

(75) Inventors: Marco Willi, Benningen am Neckar (DE); Volker Porzer, Baltmannsweiler (DE); Hans-Peter Buttau, Lauffen (DE); Peter Ludwig, Tuebingen (DE); Uwe Lindemann, Holzgerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 17 days.

(21) Appl. No.: 12/432,120

(22) Filed: Apr. 29, 2009

(65) Prior Publication Data

US 2010/0059342 A1 Mar. 11, 2010

(30) Foreign Application Priority Data

Sep. 10, 2008 (DE) .................. 10 2008 046 520

(51) Int. Cl.
B65G 13/06 (2006.01)
(52) U.S. Cl. .................. 198/791; 198/781.07
(58) Field of Classification Search ............ 198/781.07, 198/791
See application file for complete search history.

(56) References Cited

U.S. PATENT DOCUMENTS

| | | | |
|---|---|---|---|
| 2,700,451 A | 1/1955 | Burkhart | |
| 2,748,919 A | 6/1956 | Britton et al | |
| 3,667,589 A | 6/1972 | Constable | |
| 3,672,486 A | 6/1972 | Kennedy et al. | |
| 4,205,746 A | 6/1980 | Olson et al. | |
| 4,733,772 A | 3/1988 | Potter | |
| 4,899,865 A | 2/1990 | Keil | |
| 4,928,806 A | 5/1990 | Anderson et al. | |
| 4,951,808 A * | 8/1990 | Collins et al. ........ | 198/781.07 |
| 5,038,922 A * | 8/1991 | Collins et al. ........ | 198/791 |
| 5,188,215 A * | 2/1993 | Riezler ................ | 198/791 |
| 5,287,956 A | 2/1994 | Collins et al. | |
| 5,375,696 A | 12/1994 | Collins et al. | |
| 5,485,911 A * | 1/1996 | Kettelson et al. ..... | 198/791 |
| 6,367,618 B1 * | 4/2002 | Szuba ................. | 198/791 |
| 2002/0066647 A1* | 6/2002 | McTaggart et al. .... | 198/791 |
| 2003/0168319 A1 | 9/2003 | Hart et al. | |
| 2008/0190741 A1 | 8/2008 | Freudelsperger | |

FOREIGN PATENT DOCUMENTS

| | | |
|---|---|---|
| CA | 2 165 031 | 6/1996 |
| DE | 386 868 | 12/1923 |
| DE | 709 274 | 8/1941 |

(Continued)

*Primary Examiner*—James R Bidwell
(74) *Attorney, Agent, or Firm*—Michael J. Striker (57) ABSTRACT

A rolling conveyor has a plurality of feed rollers that define a conveyor surface, in which the feed rollers are joined on their end regions rotatably to a first and a second bearing assembly, at least some of the feed rollers on the second bearing assembly each have a first drive wheel, which is in rotary drive communication each with one second drive wheel, the second drive wheels are located on a rotatable drive shaft, with which they are in rotary drive communication, wherein the drive shaft is joined rotatably to a third bearing assembly, which is embodied separately from the first and second bearing assemblies, so that a drive shaft assembly comprising the drive shaft and the associated third bearing assemblies is joined as a unit detachably to the rolling conveyor.

14 Claims, 7 Drawing Sheets

FOREIGN PATENT DOCUMENTS

| | | |
|---|---|---|
| DE | 720 459 | 5/1942 |
| DE | 1 071 587 | 12/1959 |
| DE | 1 147 893 | 4/1963 |
| DE | 1 939 568 | 2/1970 |
| DE | 88 13 730 | 3/1989 |
| DE | 40 36 214 | 11/1991 |
| DE | 9012413 | 1/1992 |
| DE | 0 610 085 | 8/1994 |
| DE | 692 01 119 | 5/1995 |
| DE | 195 00 546 | 7/1996 |
| DE | 195 24 308 | 1/1997 |
| DE | 100 02 719 | 4/2001 |
| DE | 695 21 677 | 10/2001 |
| DE | 10 2005 019 067 | 3/2007 |
| DE | 10 2007 018 8 | 10/2008 |
| EP | 0 129 911 | 1/1985 |
| EP | 0 690 015 | 1/1996 |

* cited by examiner

ROLLING CONVEYOR WITH A DRIVE ASSEMBLY

CROSS-REFERENCE TO RELATED APPLICATIONS

The invention described and claimed hereinbelow is also described in German Patent Applications DE 10 2008 046 520.8 filed on Sep. 10, 2008. This German Patent Applications, whose subject matter is incorporated here by reference, provides the basis for a claim of priority of invention under 35 U.S.C. 119(a)-(d).

A subject matter which can be similar to the subject matter disclosed in the present application is also disclosed in U.S. patent application Ser. No. 12/620,879 filed Nov. 18, 2009, and U.S. patent application Ser. No. 12/422,495 filed on Apr. 13, 2009.

BACKGROUND OF THE INVENTION

The present invention relates to a rolling conveyor.

From German Patent Disclosure DE 195 24 308 A1, a rolling conveyor is known. According to FIG. 3 of DE 195 24 308 A1, the rolling conveyor includes a plurality of feed rollers 3, which are located in a row parallel to one another, so that they define a conveyor surface. On this conveyor surface, platelike workpiece holders are typically transported, which in turn carry the workpieces or other material to be conveyed. On their end regions, the feed rollers are rotatably joined to a first and a second bearing assembly 4a. In the region of the second bearing assembly, a respective first drive wheel in the form of a bevel gear wheel 8 is provided, which is solidly joined to the associated feed roller and is in rotary drive communication with a second drive wheel in the form of the bevel gear wheel 8a. The second drive wheels are located on a common drive shaft, so that all the feed rollers can be set into a rotary motion by the drive shaft.

The second bearing assemblies are each secured detachably to a frame, in the form of an aluminum profile section with undercut T-shaped grooves, and they can be secured to the frame in any arbitrary position. So that the bearing assemblies will be displaceable relative to the drive shaft as well, the drive shaft is embodied as a hexagonal shaft, and the associated second drive wheels have an adapted opening, so that they are joined to the drive shaft longitudinally movably but in a manner fixed against relative rotation.

The disadvantage of the known conveyor is that for installing and removing the drive shaft, a very great deal of space in the conveying direction upstream or downstream of the conveyor is required, since for that purpose the drive shaft must be pushed in the conveying direction out of all the bearing assemblies. This is especially disadvantageous if one feed roller to be changed, for instance because of a defective bearing. To that end, in every case, the drive shaft must be put out of engagement with the corresponding second bearing assembly, so that the latter can be removed from the frame. The displacement of the drive shaft in the conveyor that is ready for operation is impossible in many cases, however, since the conveyor is often integrated with a relatively large production line, so that there is little space available around the conveyor.

SUMMARY OF THE INVENTION

In accordance with the present invention, it is proposed that the drive shaft can be joined rotatably to a third bearing assembly, which is embodied separately from the first and second bearing assemblies, so that a drive shaft assembly comprising the drive shaft and the associated third bearing assemblies can be joined detachably as a unit and preferably is joined detachably to the rolling conveyor.

Thus the drive shaft can be installed and removed with all the second drive wheels provided on it and with the associated rotary bearings, without requiring displacement of the drive shaft in the conveying direction. For removal, all the third bearing assemblies that are associated with the drive shaft must be detached from the frame, so that the drive shaft assembly is in the form of a separate structural unit and accordingly can be removed as a unit from the rolling conveyor. The known bevel gear wheels are preferably used as the first and second drive wheels, since their driving engagement can be established and undone especially simply upon installation and removal, respectively.

The first and the second bearing assemblies can be secured detachably to a frame, and the third bearing assembly is secured detachably to the second bearing assembly. By this means, an especially simple and at the same time precise orientation between the first and second drive wheels is made possible. In this embodiment, the thought is preferably to use a frame in the form of a known T-groove profile section, so that the feed rollers can be installed on the frame in any arbitrary position. Accordingly, no special orientation contours have to be provided on the frame for the parts to be mounted there, since the location of these parts is not fixed from the outset. If the third bearing assembly were to be mounted directly on such a frame, considerable orientation effort would be necessary in order to put the first and second drive wheels into a relative position that makes low-wear and low-noise driving possible. By comparison, the second and third bearing assemblies can easily be provided with orientation contours, since their relative location is always the same, regardless of how great the spacing is between two successive feed rollers. They can furthermore be produced as mass-produced parts and are therefore especially economical.

The drive shaft can comprise a plurality of separate drive shaft segments, which are in detachable rotary drive communication with one another. The detachable rotary drive communication between the drive shaft segments is preferably brought about via a known clutch, such as a claw clutch. The individual drive shaft segments define assemblies which can in turn be installed and removed as a unit. Because the length of the drive shaft segments is shorter than that of the entire drive shaft, manipulating them in installation and removal work is substantially simpler. Preferably, consideration is given to selecting the length of the drive shaft segments such that they can be installed and removed by a single person.

The first and second bearing assemblies can include a separate receiving part with a receiving recess, which receiving part is secured detachably to the frame, and on both end regions of the feed roller, a separate rotary bearing is provided that is detachably received in the receiving recess, so that a roller assembly comprising one feed roller and the associated rotary bearings is secured as a unit detachably to the associated receiving parts. As a result, it can be attained that a single feed roller can be removed without the drive shaft having to be removing first. Moreover, this embodiment is especially economical. The rotary bearing is preferably a known radial deep groove ball bearing, which is provided with a lifetime lubrication. The corresponding receiving part is preferably made from aluminum by diecasting, so that all the contours for receiving the rotary bearing can be shaped largely without additional postmachining.

The receiving recess can be embodied as essentially U-shaped, and the opening of the U points away from the frame. In this way, it is possible especially simply to insert the feed roller, with the two rotary bearings, into the appropriate receiving recesses from the transportation region of the rolling conveyor. In this embodiment as well, the first and second drive wheels are preferably embodied as bevel gear wheels, so that their driving engagement in the installation and removal can be established and undone especially simply.

The rotary bearing can be retained by a retention part in the U-shaped recess, which is snapped into the associated receiving part. This embodiment is especially economical and at the same time can be installed especially quickly. The retention part is preferably injection-molded from plastic, so it has an adequate elasticity for the snap connection. It should be noted that because of how the receiving parts are embodied, the retention parts have purely a safety function; in other words, normally no loads act on the retention part during the operation of the rolling conveyor. Accordingly, the retention part can be made from an inexpensive plastic without any disadvantage.

The third bearing assembly can be secured detachably to the receiving part, so that the aforementioned advantages in orienting the third bearing assembly can be attained without hindering the installation and removal of the feed roller.

On the third bearing assembly, at least one hook can be provided, which can engage the receiving part. By means of this embodiment, the installation of the drive shaft assembly is simplified, especially if the drive shaft assembly is to be installed by only one person. That person can easily put the hooks of at least two third bearing assemblies of one drive shaft assembly into engagement with the associated receiving parts, so that the drive shaft assembly is retained in its final installed position. Next, the third bearing assemblies are joined solidly, for instance by means of screws, to the associated receiving parts, without the drive shaft assembly having to be firmly held during this activity. The hooks are preferably designed such that the rotational movability of the third bearing assemblies relative to the drive shaft can be utilized to establish the retention engagement. In this case, it is especially preferable if the orientation contour between the receiving part and the associated third bearing assembly is embodied in the form of a tongue and groove connection, which is located such that it does not hinder the rotational movability of the third bearing assembly relative to the drive shaft. This embodiment moreover has the advantage that orienting the third bearing assembly with respect to the drive shaft is simplified.

The receiving parts of the first and second bearing assemblies can be embodied identically and are located 180° apart from one another. Accordingly, larger numbers of receiving parts can be produced, thereby reducing the production costs. This embodiment is possible especially because the third bearing assembly is embodied separately from the second bearing assembly. Accordingly, on the receiving part of the first bearing assembly, the installation of a third bearing assembly can simply be dispensed with.

At least one U-shaped covering can be provided, which is snapped into a plurality of adjacent receiving parts. The U-shaped covering is preferably embodied as an extruded aluminum profile section. It serves primarily to protect the rotary bearings on the feed rollers against environmental factors. However, it is also possible for the drive shaft to be located at least in some portions inside the U-shaped covering, so that the drive shaft and in particular the drive wheels are protected against environmental factors. The snap connection at the receiving parts can be produced especially economically, since the receiving parts are produced in large numbers anyway, preferably by aluminum diecasting. Accordingly, the additional detent elements can be provided at virtually no additional cost.

Between two adjacent receiving parts, a platelike closure part can be provided, so that the receiving parts together with the closure parts form an essentially uninterrupted wall surface. With the closure parts, the remaining openings that are not engaged by the above U-shaped covering are meant to be closed. The closure parts are embodied in platelike fashion, so that they can be especially simply cut to the suitable length for the feed roller spacing. As already mentioned, the present rolling conveyor is constructed such that the spacing of the rollers can be adjusted in a continuously variable way. At the same time, as many parts as possible should be made as mass-produced parts, with as few parts as possible being tailored to the feed roller spacing. These latter parts should be capable of being produced as quickly as possible, so that they can be produced shortly before the conveyor is completed, thus making it possible to dispense with expensive storage. The platelike closure parts are preferably retained in a groove of the associated receiving parts, since this groove can be made especially simply by aluminum diecasting.

At least one lateral guide strip can be provided, which laterally defines the conveyor surface, and the lateral guide strip is secured to the receiving parts. It is known to provide rolling conveyors with a lateral guide for the workpiece holders. This lateral guide can be secured to the receiving parts especially simply, since the receiving parts can easily be equipped with suitable retention means, which can be provided especially inexpensively on this mass-produced part. The lateral guide is preferably an extruded aluminum profile section, which is provided with a replaceable friction lining for the workpiece holders that is preferably of plastic or steel.

A free space between two feed rollers can be closed by at least one covering which is located essentially parallel to the conveying plane, and the covering is secured to at least one receiving part and preferably to all the receiving parts of the adjacent feed rollers. It is known to provide coverings between the feed rollers and rolling conveyors, in order to prevent parts from falling through the spaces between the feed rollers. The mass-produced receiving parts can be equipped easily and inexpensively with suitable retention means, which make it possible to secure the coverings without problems and quickly. Preferably, consideration is given to making the coverings from sheet metal, and detent means into which the metal sheets can be snapped are provided on the receiving parts.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
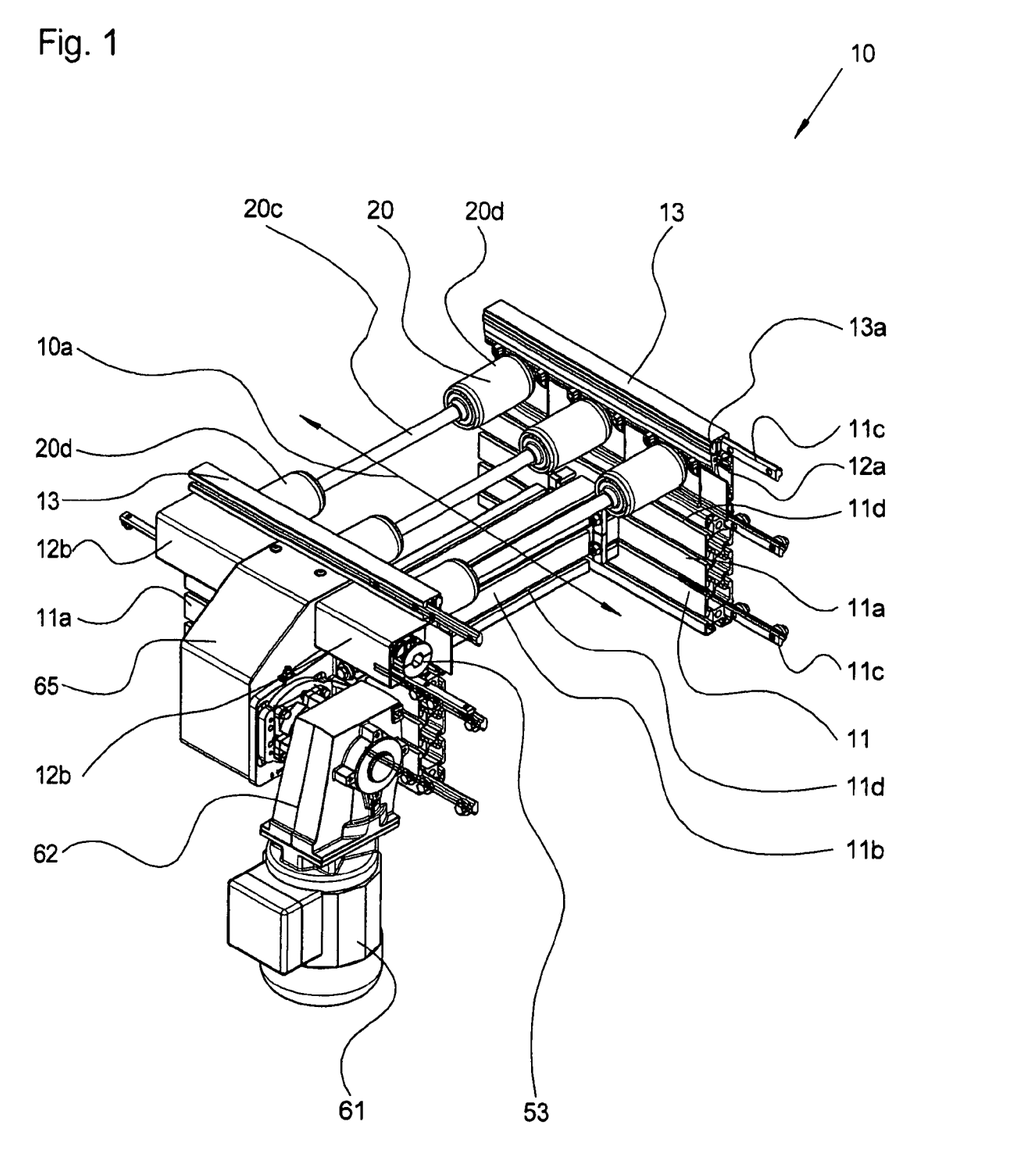
FIG. 1 is a perspective view of a modular portion of a rolling conveyor of the invention, which is equipped with a motor.

FIG. 1 shows a modular portion of a rolling conveyor 10, which, with further similar modules, is intended to form the entire conveyor route. Since this module is equipped with a motor 61 for driving the feed rollers 20, it is called a drive module.

The drive module includes a frame 11 with two parallel longitudinal beams 11a, which extend parallel to the conveying direction 10a and which are joined to one another via a transverse beam 11b. The longitudinal beams 11a and the transverse beam 11b are each extruded from aluminum, and on their outer surfaces a plurality of undercut, T-shaped grooves 11d are provided, to which other components can be secured at different, continuously variable positions. On the face ends of the longitudinal beams 11a, a plurality of connection strips 11c are received in the undercut grooves, and with these connection strips, adjoining modules of the rolling conveyor can be fixedly joined together.

On the top side of the longitudinal beams 11a, a plurality of parallel feed rollers 20 are each rotatably supported on both ends. The feed rollers each include a steel roller shaft 20c, on each of whose two end regions a respective contact portion 20d is provided that has a circular-cylindrical surface. The contact portion comprises a plastic core, on the surface of which a steel sleeve is provided, as wear protection. The contact portions 20d define a flat conveyor surface, in which the product being conveyed, in the form of a platelike workpiece holder (not shown), can be moved. Laterally, the conveyor surface is bounded by two lateral guide strips 13, which are provided with a replaceable friction lining 13a of plastic or steel, along which the workpiece holders slide. The lateral guide strips 13 are likewise extruded from aluminum.

On a side face of one longitudinal beam 11a, an electric motor 61 is provided, which is in rotary drive communication with a drive shaft, via a gear drive 62 and a toothed belt drive. Since the drive shaft is covered by a covering 12b, all that can be seen of the drive shaft in FIG. 1 is the claw clutch 53 on its end, with which the rotary drive communication with the drive shaft of the adjacent module of the rolling conveyor is established. The transmission of force from the drive shaft to the feed rollers 20 will be described in further detail hereinafter. The toothed belt drive cannot be seen in FIG. 1, either, since for safety reasons it is covered by the belt covering 65. The covering 12a on the side diametrically opposite the drive shaft should also be pointed out. The two coverings 12a and 12b are each extruded from aluminum and are substantially U-shaped in cross section, differing only with regard to the length of the legs of the U.

Figure 2:
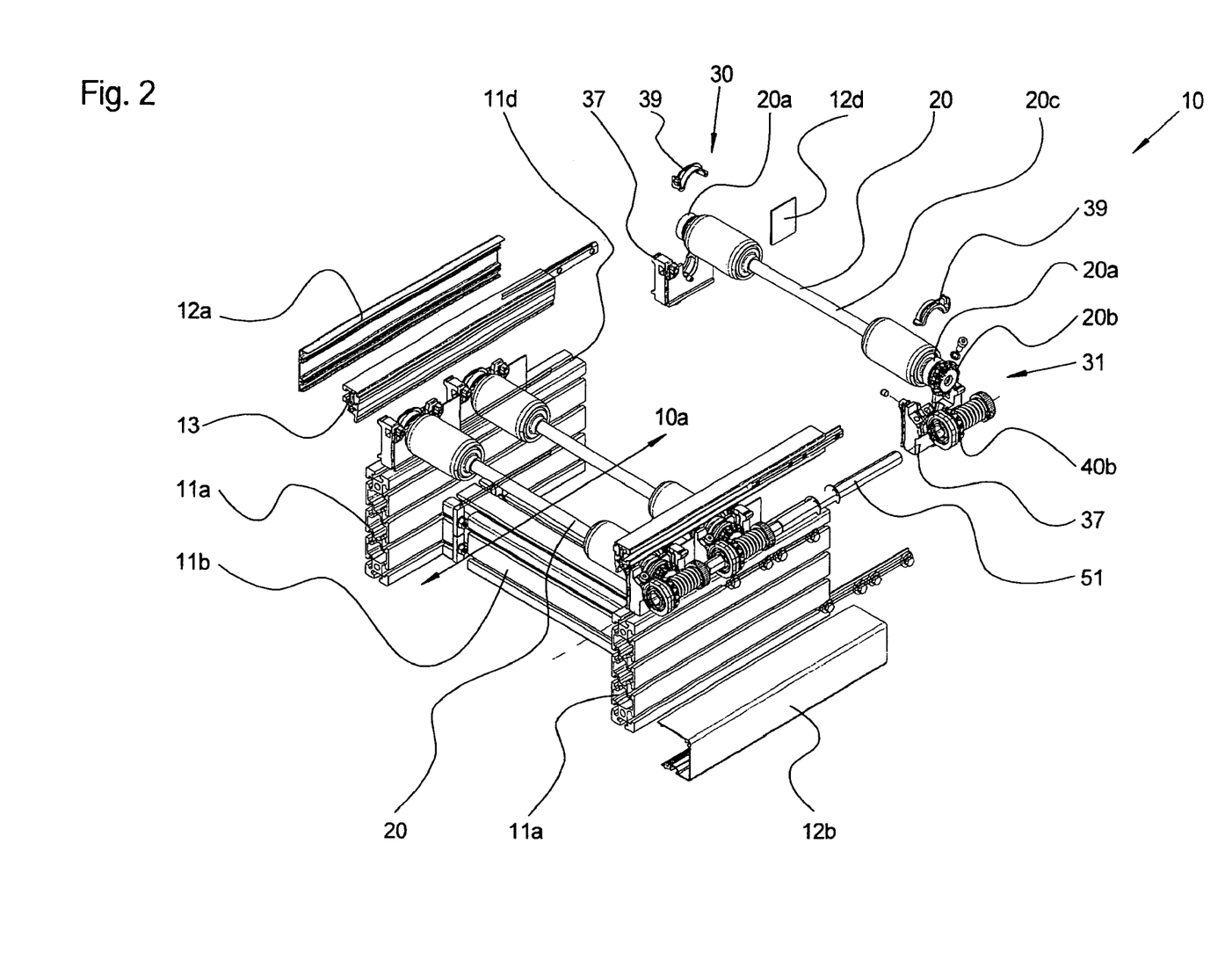
FIG. 2 is an exploded view of a modular portion of a rolling conveyor of the invention, which is not equipped with a motor.

FIG. 2 shows a further module of the rolling conveyor 10 of the invention, which is not equipped with a drive motor. It is therefore also called a system module. The system module of FIG. 2, except for the lack of the drive, is embodied identically to the drive module of FIG. 1. Accordingly, identically embodied parts are provided with the same reference numerals. With respect to the identical parts, see the above description, to avoid repetition.

In FIG. 2, the feed rollers 20 are each equipped with a first drive wheel 20b, in the form of a bevel gear wheel, which is secured directly to the roller shaft 20c in a manner fixed against relative rotation. A second drive wheel 40b, which is likewise embodied as a bevel gear wheel, is associated with each first drive wheel 20b. To assure gear wheel engagement with little noise or wear, the first drive wheel 20b comprises polyoxymethylene (POM), while the second drive wheel 40b is a polyamide (PA) or sintered metal, or vice versa. Every second drive wheel 40b is disposed on a common drive shaft 51, which has the same length as the associated module of the rolling conveyor 10. The rotary drive engagement between the second drive wheels 40b and the drive shaft 51 will be addressed in further detail hereinafter. The drive shaft 51 is oriented precisely perpendicular to the associated parallel feed rollers 20, and the axes of rotation each intersect at a point.

The rotary bearing of the feed rollers 20 is accomplished by providing that on each of the two end regions of the feed roller 20 on the roller shaft 20c, a respective rotary bearing 20a is provided, in the form of a radial deep groove ball bearing provided with lifetime lubrication. The rotary bearings 20a are each received in a separate receiving part 37, which can be secured in any arbitrary position with regard to the conveying direction 10a at an undercut groove 11d of the longitudinal beam 11a. The two receiving parts 37 that are associated with one feed roller 20 are each embodied identically and are located 180° away from one another. Between two adjacent receiving parts 37, one platelike closure part 12d is provided, so that the receiving parts 37 with the associated closure parts 12d form a closed wall, each of which, together with the coverings 12a or 12b, enclose a substantially completely closed-off space in which the associated bearing and drive components are received in a way protected against environmental factors.

It should also be pointed out that the second bearing assembly 31 is formed by the receiving part 37 on the side of the drive shaft 51, the associated rotary bearing 20a, and the corresponding retention part 39. The first bearing assembly 30 is formed by the corresponding parts on the diametrically opposite side of the feed roller 20.

Figure 3:
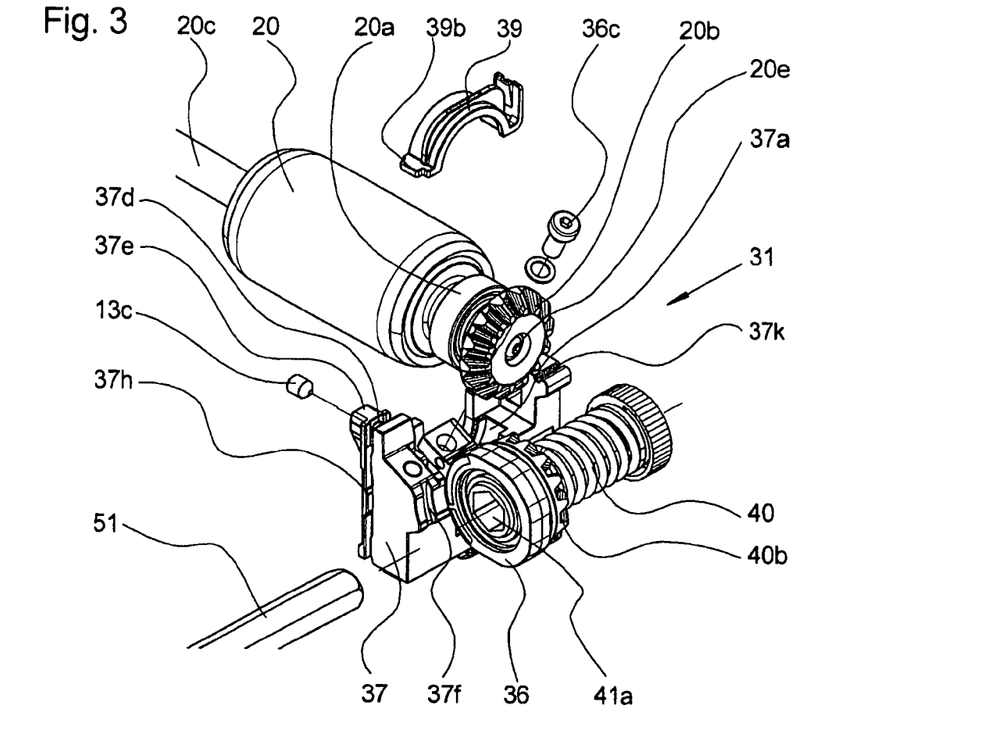
FIG. 3 is a first exploded view of the second and third bearing assemblies with the drive assembly.
Figure 3A:
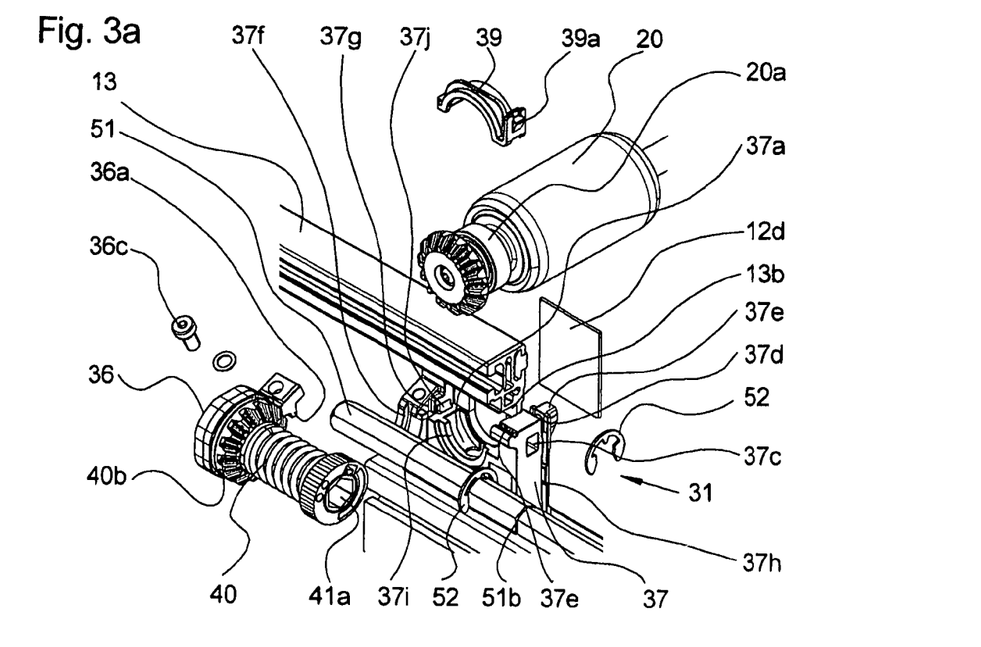
FIG. 3a is a second exploded view of the second and third bearing assemblies with the drive assembly of FIG. 3.

FIG. 3 shows an enlarged detail of FIG. 2, with the second bearing assembly 31, the third bearing assembly 36, and the drive assembly 40. FIG. 3a shows the same arrangement from a different direction.

The drive assembly 40 having the second drive wheel 40b is joined detachably, via the third bearing assembly 36, to the receiving part 37 of the second bearing assembly 31, and the aforementioned assemblies are secured to one another via the screw bolt 36c. A groove 37f is provided on the receiving part 37 and is engaged by an adapted orientation extension (36g in FIG. 4a) on the third bearing assembly 36 for the sake of mutual orientation. The groove 37f extends in the circular arc about the axis of rotation of the drive shaft 51, so that the third bearing assembly 36 can be rotated freely about the aforementioned axis of rotation, even when the drive shaft 51 is already in its installation position. On the third bearing assembly 36, a hook 36a is provided, which can catch in a suitable recess 37g on the receiving part 37. In the installation of the rolling conveyor, accordingly first the third bearing assemblies 36 with the associated drive assemblies 40 are slipped onto the drive shaft 51, producing a drive shaft assembly.

The drive assembly is provided for that purpose with a hexagonal opening 41a, which is adapted to the hexagonal cross-sectional shape of the drive shaft 51 in such a way that on the one hand a form-locking rotary drive communication and at the same time the desired longitudinal displaceability between the drive assembly 40 and the drive shaft 51 are brought about. The aforementioned drive shaft assembly is now caught with the aid of the hook 36a in the corresponding receiving parts 37, so that it is retained in the desired final installed position. Normally, a sufficient hold is achieved is achieved if only two hooks 36a, which are on the ends relative to the drive shaft 51, are caught. The third bearing assemblies 36 can now be rotated into their installation position about the axis of rotation of the drive shaft 51 and screwed to the associated receiving parts 37. Once this work is concluded, the position of the drive shaft, which is longitudinally displaceable relative to the drive assembly 40, is secured with positioning means, in the form of two securing disks 52. The securing disks 52 are snapped for that purpose into corresponding grooves 51b that are provided on the drive shaft 51, and the drive shaft 51 is equipped with a plurality of such grooves, whose locations are adapted to the predetermined spacing dimensions of the feed rollers 20.

In FIGS. 3 and 3a, the grooves 37h for receiving the plate-like closure parts 12d can also be seen. The receiving grooves 37d for receiving the securing rib 13b of the lateral guide. 13 can also be seen, which are provided on the face ends of the legs of the of the generally U-shaped receiving part 37. The lateral guide 13 is secured in these receiving grooves 37d with the aid of the threaded pins 13c. The associated female-threaded portion on the receiving part 37 simultaneously acts as a counterpart detent means 37e for corresponding detent means at coverings (not shown) between the feed rollers 20. The detent lugs 37k for the lateral coverings (12a and 12b in FIG. 2) should also be pointed out. The receiving part 37 is made from aluminum by diecasting, so that the many securing contours can be furnished economically.

Also in FIGS. 3 and 3a, the receiving recess 37a of the receiving part 37 for receiving the rotary bearings 20a at the feed roller 20 can be seen. The receiving recess 37a is provided with rims 37i on both sides, which prevent shifting of the rotary bearing in the direction of the axis of rotation of the associated feed roller 20. The opening in the receiving recess 37a is closed by a retention part 39 of plastic, which is a continuation of the aforementioned receiving contours for the rotary bearing 20a on the receiving part 37 to the shape of a full circle. The retention part is provided with an elastic snap hook 39a, which is snapped into an adapted opening 37c. On the diametrically opposite side, the retention part 39 is provided with a substantially rigid retention extension 39b, which engages an adapted recess 37j in such a way that the retention part 39 can be tilted by at least 300 relative to the receiving part 37, making simple installation of the retention part 39 possible. The first drive wheel 20b is secured to the roller shaft 20c with a securing screw 20e, and two wrench faces (not visible) are provided on the face end of the roller shaft 20c and bring about a form-locking engagement between the first drive wheel 20b and the associated roller shaft 20c.

Figure 4:
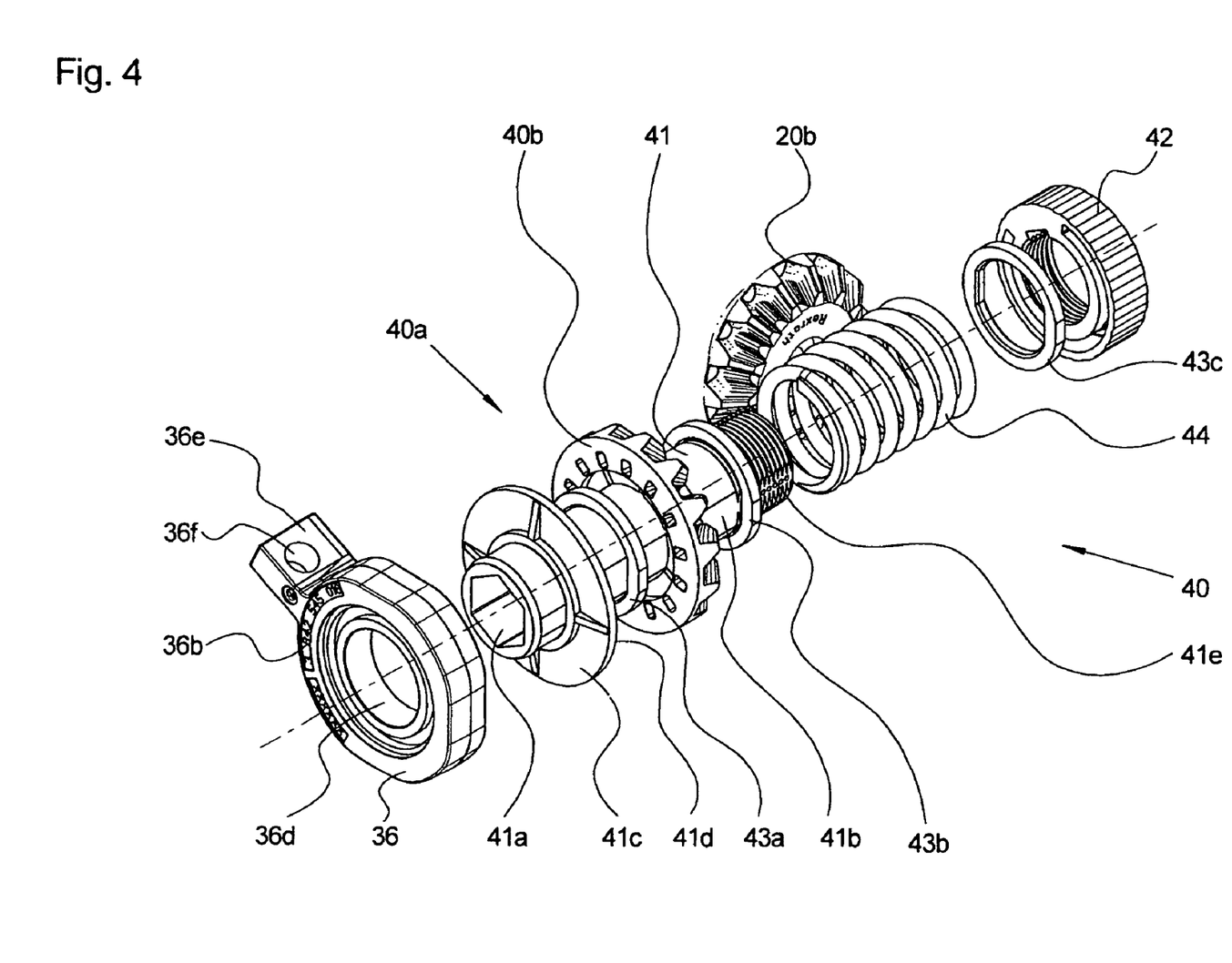
FIG. 4 is an exploded view of a drive assembly with the associated third bearing assembly.
Figure 4A:
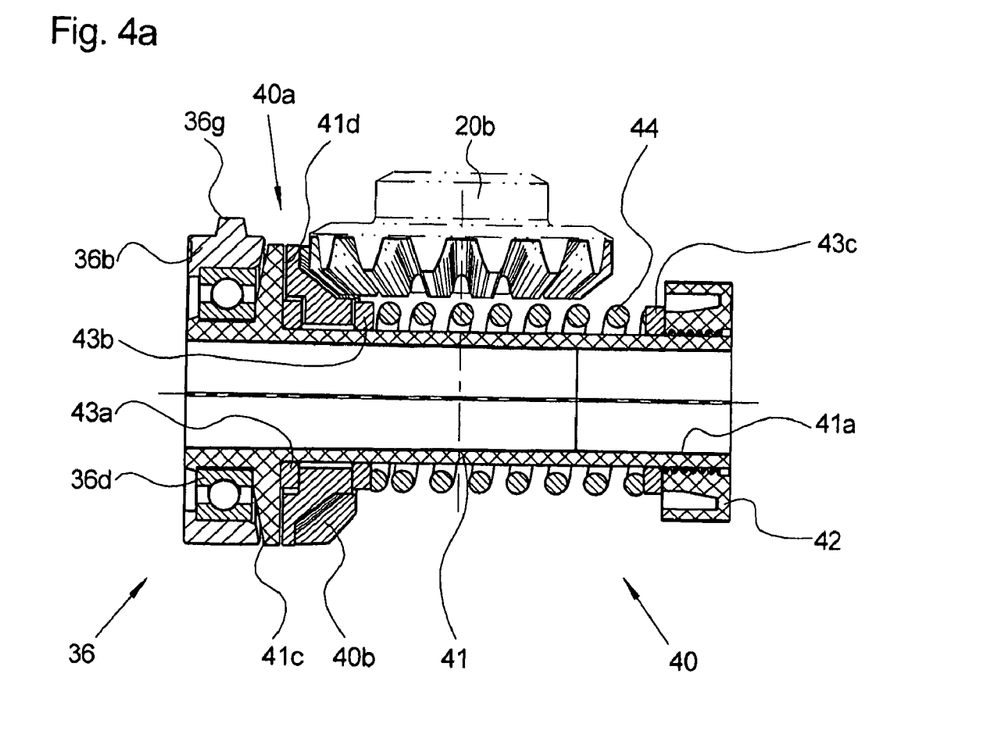
FIG. 4a is cross section through the assembly of FIG. 4.

FIG. 4 is an exploded view of the drive assembly 40 with the associated third bearing assembly 36. FIG. 4a shows the aforementioned assemblies in cross section.

The third bearing assembly 36 includes a basic component 36b of diecast aluminum, with a built-in radial deep groove ball bearing 36d with lifetime lubrication, as a rotary bearing for the drive assembly 40. A securing extension 36e with a securing bore 36f for the aforementioned screw bolt (36c in FIG. 3) is located on the basic component 36b. The orientation extension 36g, visible in FIG. 4a, should also be mentioned, which engages the groove (37f in FIG. 3) of the receiving part.

The drive assembly 40 includes a substantially circular-cylindrical sleeve 41, which is injection-molded from fiber-reinforced polyamide. On the inside of the sleeve, an opening 41a with a hexagonal cross section is provided, which is adapted to the drive shaft such that the sleeve 41 is displaceable on the drive shaft longitudinally, and at the same a form-locking rotary drive communication is provided. On the outer circumferential surface of the sleeve 41, a flange 41c is provided integrally, on the left-hand side of which, in FIG. 4, the rotary bearing 36d is mounted on the sleeve 41 in such a way that the drive assembly 40 can be installed as a unit in the third bearing assembly 36. The right-hand side face of the flange in terms of FIG. 4 serves as a support face 41d for the tensing force that is exerted by the helical spring 44 on the second drive wheel 40b and the slide rings 43a, 43b. A total of three identical slide rings 43a, 43b and 43c of polyoxymethylene (POM) or sintered metal are provided on the outer circumferential surface of the sleeve 41 and are retained on the sleeve 41 longitudinally displaceably and in a manner fixed against relative rotation via two diametrically opposed wrench faces 41b. The first and second slide rings 43a, 43b serve primarily as a friction face for the second drive wheel 40b, so that together with the helical spring 44, a slip clutch 40a is formed.

The second drive wheel 40b is designed here such that it does not rub on the flange 41c, and thus solely the first and second slide rings 43a, 43b define the limit torque of the slip clutch 40a. The second slide ring 43b is furthermore intended to prevent the spring 44 from being slaved by the rotating second drive wheel 40b, so that it is always still relative to the sleeve 41. The third slide ring 43c prevents the transmission of a rotary motion of the stop 42 to the spring 44. The stop 42 is in helical engagement with a male thread 41e on the sleeve 41, so that by rotation the stop can be shifted longitudinally relative to the sleeve 41, thereby prestressing the spring 44 against the second drive wheel 40b. The male thread 41e is a fine screw thread, so that it is self-locking in order that the stop 42 will not come loose on its own.

Figure 5:
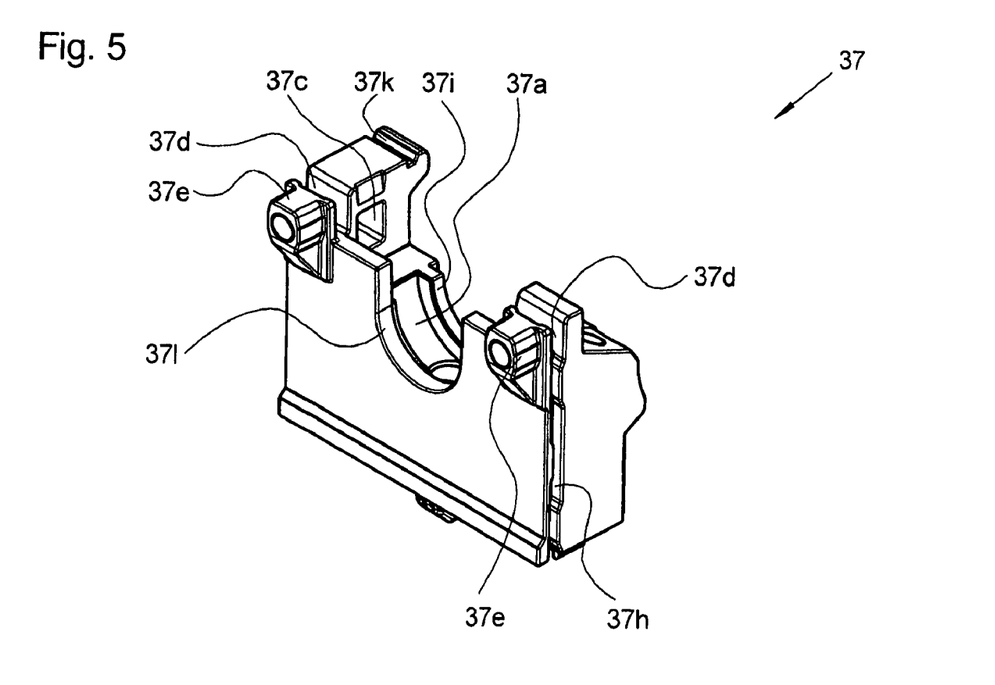
FIG. 5 is a perspective view of the receiving part.

FIG. 5 shows a perspective view of the receiving part 37 from the opposite direction compared to FIGS. 3 and 3a. At this point, all that needs to be pointed out is the U-shaped recess 37l, which is adapted to the axis of the feed roller with a slight spacing, so that the rotary bearing located behind it is well protected against environmental factors. For the rest, see the description of FIGS. 3 and 3a, to avoid repetition.

Figure 6:
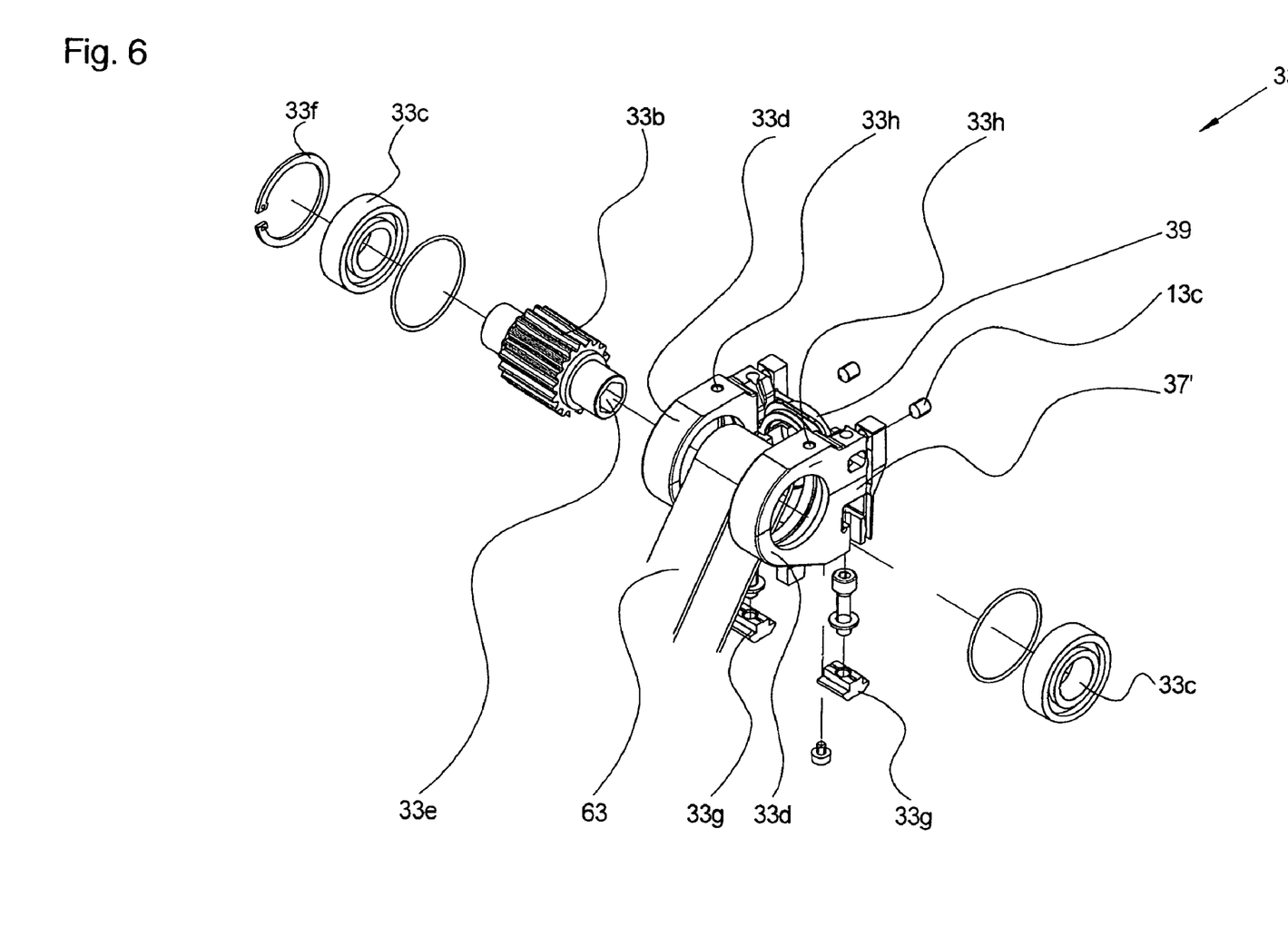
FIG. 6 is an exploded view of a second bearing assembly, which is equipped with a third drive wheel.

FIG. 6 shows a second bearing assembly 33, which is equipped with a third drive wheel 33b. With regard to the bearing of the feed roller (not shown) and the securing of the adjoining components, this bearing assembly 33 is embodied precisely like the second bearing assembly (31 in FIGS. 3 and 3a) that is not provided with a third drive wheel, so that in this respect, reference is made to the description above.

The third drive wheel 33b serves to drive the drive shaft (51 in FIG. 2). For that purpose, it is connected to an electric motor (not shown) via a tension means 63 in the form of a toothed belt. The rotary drive communication with the drive shaft, as is the case for the drive assembly (40 in FIG. 4), is established via a hexagonal opening 33e in the third drive wheel 33b, so that the third drive wheel 33b is joined to the drive shaft by form locking in a manner fixed against relative rotation, and at the same time, for the sake of simple installation, the drive shaft is longitudinally displaceable relative to the third drive wheel 33b.

The third drive wheel 33b is located in a rectilinear extension of the feed roller, in the region where the second drive wheel is normally located. Two bearing flanges 33d are integrally provided on the receiving part 37' for this purpose. In each of the two bearing flanges 33d, a respective rotary bearing 33c in the form of a radial deep groove ball bearing with lifetime lubrication is received, in which the third drive wheel 33b and thus the drive shaft are rotatably supported. In addition, the receiving part 37' is embodied identically to the receiving part 37. The two-sided bearing of the third drive wheel 33b is necessary so that the rotary bearing withstands the tensile forces resulting from the tension of the toothed belt 63 over a sufficiently long period of time. The assembly comprising the third drive wheel 33b and the two associated rotary bearings 33c is held in the second bearing assembly 33 by the securing ring 33f. With the two sliding blocks 33g, the second bearing assembly 33 is secured to the undercut grooves in the associated longitudinal beam. The two securing threads 33h serve to secure the belt covering (65 in FIG. 1).

Figure 7:
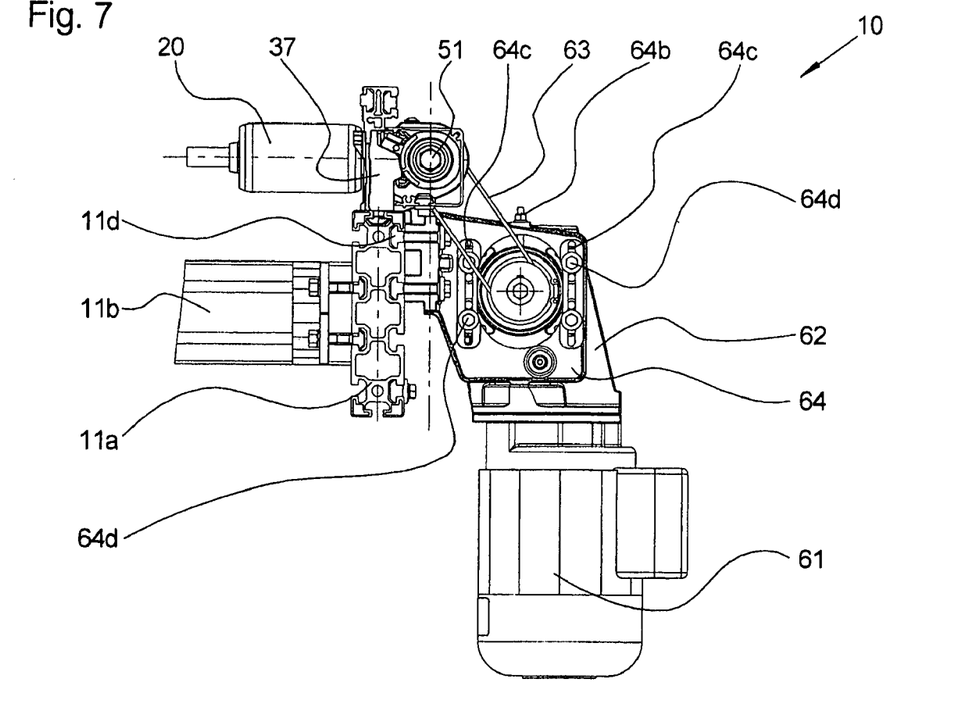
FIG. 7 is a front view of the drive module of FIG. 1.

FIG. 7 shows a front view of the drive module of FIG. 1, with the belt covering (65 in FIG. 1) removed. The motor flange 64 can be seen, with which the electric motor 61 and the gear mechanism 62 are secured to the undercut grooves lid in the longitudinal beam 11a. For the fixation of the location of the motor flange 64 on the longitudinal beam 11a, the latter is displaced in the conveying direction until such time as it abuts against the associated second bearing assembly on the receiving part 37. These components and the motor 61 are adapted to one another in such a way that in this position, the toothed belt 63 is oriented precisely perpendicular to the axis of rotation of the drive shaft 51. The motor flange 64 is equipped with two oblong slots 64c, so that the motor 61 can be secured to the motor flange 64 in different positions. With the aid of the setting screw 64b, the motor 61 is displaced into the position in which the toothed belt 63 has the appropriate tension. The motor 61 is then screwed firmly to the motor flange 64 by means of the securing screws 64d.

Figure 7A:
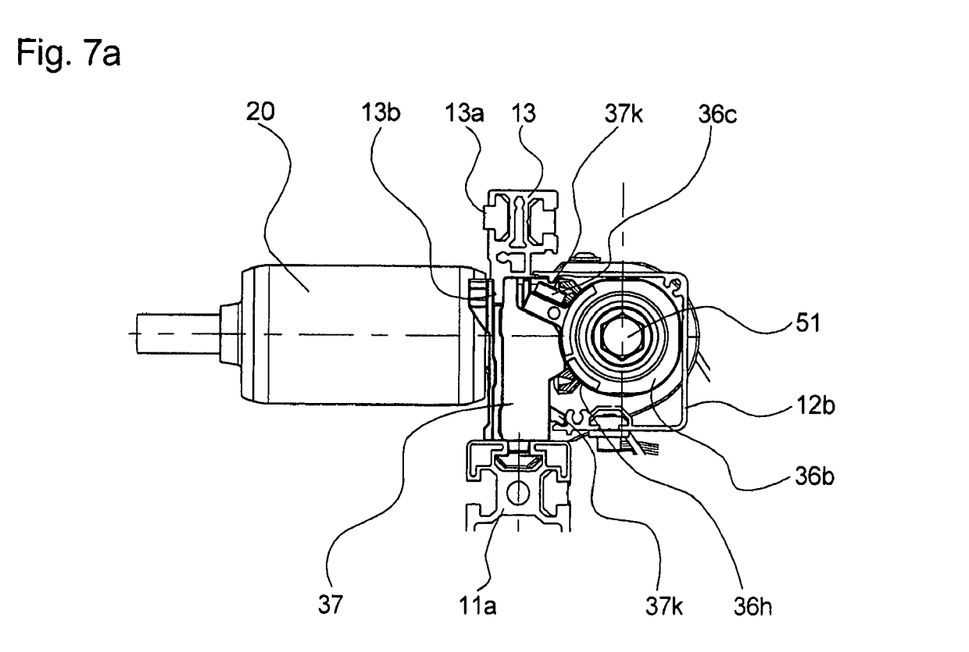
FIG. 7a is an enlarged detail of FIG. 7 in the region of the drive shaft.

FIG. 7a is an enlarged detail of FIG. 7 in the region of the hexagonal drive shaft 51. It can be seen in particular from this view how the U-shaped covering 12b is snapped into the associated detent lugs 37k on the receiving part 37. The lateral guide strip 13 can also be seen, with the friction lining 13a received in it that protrudes somewhat past the lateral guide strip 13, so that the associated workpiece holder (not shown) is in sliding contact with only the friction lining 13a. It is also shown how the lateral guide strip 13 is inserted with its securing rib 13b into the receiving part 37. The basic component 36b with its outer circumferential surface 36h that is concentric with the drive shaft 51 should also be pointed, which makes it possible to rotate the third bearing assembly relative to the drive shaft 51, with the screw bolt 36c removed, in the course of which the outer circumferential surface 36h simultaneously acts as a contact face for the receiving part 37.

It will be understood that each of the elements described above, or two or more together, may also find a useful application in other types of constructions differing from the types described above.

While the invention has been illustrated and described as embodied in a rolling conveyor with a drive assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A rolling conveyor, comprising a plurality of feed rollers defining a conveyor surface, said feed rollers being joined on their end regions rotatably to a first and a second bearing assembly, at least some of said feed rollers on said second bearing assembly each have a first drive wheel which is in rotary drive communication each with one of second drive wheels, and said second drive wheels being located on a rotatable drive shaft with which they are in rotary drive communication, said drive shaft being joined rotatably to a third bearing assembly which is configured separately from said first and second bearing assemblies, so that a drive shaft assembly comprising said drive shaft and associated third bearing assemblies is joinable detachably as a unit to the rolling conveyor, wherein said drive shaft assembly comprising said drive shaft and said associated third bearing assemblies is joined detachably as the unit to the rolling conveyor, wherein said first and second bearing assemblies include a separate receiving part with a receiving recess, said receiving part being detachably secured to said frame, and on both end regions of said feed roller, a separate rotary bearing is provided that is detachably received in said receiving recess, so that a roller assembly comprising one feed roller and associated rotary bearings is secured as a unit detachably to associated receiving parts.

2. The rolling conveyor as defined in claim 1, wherein said first and said second bearing assemblies are secured detachably to a frame, and said third bearing assembly is secured detachably to said second bearing assembly.

3. The rolling conveyor as defined in claim 1, wherein said drive shaft has a plurality of separate drive shaft segments which are in detachable rotary drive communication with one another.

4. The rolling conveyor as defined in claim 1, wherein said receiving recess is configured as substantially U-shaped, with an opening of U pointing away from said frame.

5. The rolling conveyor as defined in claim 4, wherein said rotary bearing is retained by a retention part in said U-shaped recess, which is snapped into an associated receiving part.

6. The rolling conveyor as defined in claim 1, wherein said third bearing assembly is secured detachably to said receiving part.

7. The rolling conveyor as defined in claim 1, wherein on said third bearing assembly, at least one hook is provided which is engageable with the receiving part.

8. The rolling conveyor as defined in claim 1, wherein said receiving parts of said first and second bearing assemblies are configured identically and located rotated by 180° from one another.

9. The rolling conveyor as defined in claim 1, wherein at least one U-shaped covering is provided, which is snapped into a plurality of adjacent receiving parts.

10. The rolling conveyor as defined in claim 9, wherein said drive shaft is located at least in some portions inside said U-shaped covering.

11. The rolling conveyor as defined in claim 1, wherein between two adjacent receiving parts, a plate-shaped closure part is provided, so that said receiving parts together with said closure parts form a substantially uninterrupted wall surface.

12. The rolling conveyor as defined in claim 1, wherein at least one lateral guide strip is provided, which laterally defines the conveyor surface, and said lateral guide strip being secured to said receiving parts.

13. The rolling conveyor as defined in claim 1, wherein a free space between two feed rollers is closed by at least one covering which is located substantially parallel to the conveying plane, and said covering being secured to at least one receiving part of adjacent feed rollers.

14. The rolling conveyor as defined in claim 13, wherein said covering is secured to all receiving parts of the adjacent feed rollers.

* * * * *